United States Patent
Iwanaga

[11] Patent Number: 6,152,480
[45] Date of Patent: Nov. 28, 2000

[54] STRUCTURE OF DOOR PORTION OF AIR BAG AND METHOD OF PRODUCING DOOR PORTION OF AIR BAG

[75] Inventor: Kentaro Iwanaga, Aichi, Japan

[73] Assignee: Inoac Corporation, Aichi, Japan

[21] Appl. No.: 09/315,023

[22] Filed: May 20, 1999

[30] Foreign Application Priority Data

Nov. 16, 1998 [JP] Japan .................................. 10-325390

[51] Int. Cl.$^7$ ................................................. B60R 21/16
[52] U.S. Cl. ...................................... 280/728.3; 280/232
[58] Field of Search ............................ 280/728.2, 728.3, 280/732

[56] References Cited

U.S. PATENT DOCUMENTS

| | | | |
|---|---|---|---|
| 5,303,951 | 4/1994 | Goestenkors et al. | 280/728.3 |
| 5,482,313 | 1/1996 | Ikeya et al. | 280/728.2 |
| 5,527,064 | 6/1996 | Kai et al. | 280/728.2 |
| 5,588,669 | 12/1996 | Leonard et al. | 280/728.3 |
| 5,887,891 | 3/1999 | Taquchi et al. | 280/728.2 |

*Primary Examiner*—Kenneth R. Rice
*Attorney, Agent, or Firm*—Sughrue, Mion, Zinn, Macpeak & Seas, PLLC

[57] ABSTRACT

A door substrate 21 includes a plate-like door substrate body 22, a peripheral flange 32 formed on the outer periphery of the door substrate body, a hinging wall 23 protruding from the back of the outer periphery of said door substrate body so as to correspond to one side of the air bag case and an attaching wall 24 protruding from the back of the outer periphery of the door substrate body so as to correspond to at least one of the remaining sides of said air bag case. The door substrate includes a hinging side outward-extending sandwiching piece 31 formed on the back of the peripheral flange 32 on the side of said hinging wall or the side of the hinging wall, and a fragile portion 27 for breakage at the stem of the attaching wall 24 and an attaching side sandwiching piece 29 formed on the side wall of the attaching wall to sandwich an peripheral edge of an air bag door opening. The hinging wall is secured to the air bag case.

5 Claims, 16 Drawing Sheets

STRUCTURE OF DOOR PORTION OF AIR BAG AND METHOD OF PRODUCING DOOR PORTION OF AIR BAG

BACKGROUND OF THE INVENTION

1. Field of the Invention

The present invention relates to a structure of an air bag door portion and a method of producing the air bag door portion.

2. Description of the Conventional Art

In recent years, in order to protect occupants of a motor carat the time of collision, as shown in FIG. 17 and FIG. 18 showing a section taken in line C—C in FIG. 17, an air bag device 90 has been provided on the back of an instrument panel 60. The air bag device 90 includes an air bag case 91 secured to e.g. reinforcement member of a car body and disposed on the back of the instrument panel 60, an inflator (operating device) 92 accommodated within the air bag case 91 and a folded air bag 93. On the other hand, the instrument panel 60 is provided with an air bag door portion 61 immediately above the air bag device 90. As seen from FIG. 19, when the inflator 92 is operated because of shock at the time of collision, the air bag 93 expands to push the air bag door portion 61 from the back into a car chamber or compartment. Thus, the air bag door 61 is opened so that the air bag 93 develops into the compartment 93.

There have been proposed two kinds of instrument panels having the air bag door portion. In the one kind of instrument panel, a separate door portion is attached after the instrument panel is molded. In another kind of instrument panel, the air bag door portion is formed integrally to the instrument panel while it is manufactured. From the viewpoint of manufacturing workability and appearance of the edge of the air bag door portion, the integrally molded product is preferred.

The instrument panel shown in FIGS. 18 and 19 is an example in which it is integrally provided with the air bag door portion 61. The instrument panel 60 is structured as follows. A door substrate (base material) 64 of hard resin or metal is disposed in an air bag door opening 63 formed in an instrument panel substrate (base material) 62 of e.g. hard resin, so that the one side 65 which is the side of a hinge H of the door substrate 64 is secured at the peripheral edge of the air bag door opening 68 by a securing member 66 composed of a bolt and nut. In addition, a foam member 68 is foam-molded between a surface member 67 and the door substrate 64 and the instrument panel substrate 62 at the peripheral edge thereof. On the remaining side 69 of the door substrate 64, a securing piece 70 is provided which is secured to the peripheral edge of the air bag door opening 63. On the surface member 67, a breakage or rupture scheduling portion 71, which defines the position of the air bag door portion 61 and is broken at the time of expansion of the air bag, is formed fragilely as a notch. The portion which serves as the hinging side H of the door substrate 64 at the peripheral edge of the air bag door opening 63 undergoes excess force at the time of expansion of the air bag. Therefore, the peripheral edge of the air bag door opening 63 is sandwiched by a bracket 72 which is secured to an air bag case 91 by welding so that it is reinforced. Reference numeral 73 denotes another securing member and 74 denotes another bracket.

The air bag door portion 61 is adapted so that when the securing piece 70 of the door substrate 64 is pushed from its back because of the expansion of the air bag 93, the securing piece 70 of the door substrate 64 comes off from the peripheral edge of the air bag door opening 63. Then, the foam member 68 and the breakage scheduling portion 71 of the surface member 67 are broken along the peripheral edge of the door substrate 64. As a result, the air bag door portion 61 is bent and opened into the vehicle chamber at a fulcrum of the hinge H side of the door substrate. Accordingly, the air bag 93 can develop into the vehicle chamber.

The air bag door portion 61 is manufactured as seen from FIG. 20. After the door substrate 64 is attached to the air bag door opening 63 of the instrument panel substrate 62, the instrument panel substrate 62, door substrate 64 and surface member 67 are disposed in the cavity 76 in a foaming mold 75. Between the door substrate 64 and instrument panel substrate 62, and the surface member 67, liquid foaming raw material 77 such as polyurethane is injected to mold the foam member 68. In this case, in order to prevent the foaming material 77 from being leaked, the peripheral edge of the door substrate is brought into contact with the peripheral edge of the air bag door opening 63 of the instrument panel substrate 62.

Meanwhile, as seen from FIG. 21 showing a section taken in line D—D in FIG. 18, in order that the integrally-molded air bag door portion 61 can be opened at the time of expansion of the air bag 93, it is structured so that on both sides of the door substrate 64 in a direction of a vehicle width, the peripheral edge 78 of the air bag door opening of the instrument panel substrate 62 is only secured to the securing pieces 70 at the peripheral edge of the door substrate, but not secured to the air bag case 91. Therefore, the door substrate 64 is likely to deform as indicated by arrow by pushing force when the air bag 93 expands. Further, as described above, when the air bag door portion is molded, the peripheral edge of the door substrate 64 is kept in intimate contact with the peripheral edge 78 of the air bag door opening so that the foaming material does not leak. For this purpose, a large number of the securing pieces 70 are provided at the peripheral edge of the door substrate 64, which are engaged with the peripheral edge 78 of the air bag door opening. Therefore, when the air bag 93 expands, the edge except the hinging side of the door substrate 64 is difficult to separate smoothly from the air bag door opening. Further, in the integral molding of the air bag door portion, the foam member 68 is foam-molded as an integral product in which the air bag door portion and its surrounding general portion are continuous so that when the air bag 93 expands, the foam member 68 must be broken forcibly at the peripheral edge of the door substrate. Thus, when the air bag 93 expands, the air bag door portion 61 and its peripheral portion first deform greatly Next, the securing pieces 70 are separated and foam member 68 is broken. Finally, the air bag door portion 61 is opened. Accordingly, the instrument panel may be damaged or broken owing to such deformation.

In order to prevent the instrument panel from being deformed or damaged owing to direct application of the pushing force to the instrument panel when the air bag expands, the air bag door portion 86 can be structured as shown in FIG. 23 using the door substrate 80 as shown in FIG. 22. Specifically, securing pieces 81 are provided at the peripheral edge of the door substrate to secure an instrument panel substrate 82 to the peripheral edge 83 of the air bag door opening. On the other hand, on the back of the door substrate 80, the securing piece 84 which protrudes along the side of an air bag case 91a is provided to secure the air bag case 91a to the securing piece 34. In addition, on the back of the door substrate 80, a fragile portion for breakage 85 may be formed along the inside of another securing piece 84b except the securing piece 84a on the hinging side Ha. In this case, the fragile portion 85 for breakage of the door substrate 80 is broken when the air bag 93 expands. Thus, with the securing piece 84b on the outer periphery of the broken portion and its outside being left on the peripheral edge of the air bag opening 83, the air bag door portion 86 is opened into the compartment at a fulcrum of the hinge siding side H. Therefore, the pushing force when the air bag 93a expands is applied to the inside of the door substrate 80 mainly encircled by the fragile portion 85 so that the deforming force applied to the peripheral edge 83 of the air bag door opening of the instrument panel substrate 82 can be reduced.

In the structures as shown in FIGS. 22 and 23, the fragile portion 85 for breakage is provided along the inside of the securing piece 86. Therefore, when the surface of the air bag door portion 86 is pushed by an occupant or others, the stress is concentrated on the fragile portion 85 so that the fragile portion may be easily broken and the surface of the air bag door portion 86 may sink. This impairs the appearance of the instrument panel. Incidentally, in order to prevent the fragile portion 85 for breakage from being broken owing to the pushing force from the surface side of the air bag door portion 86, a soft material with low bending resiliency and low rigidity may be used as the door substrate 80. However, in order to prevent the sink due to the breakage, the bending resiliency of the door substrate 80 must be reduced to 2000–3000 kg/cm$^2$ which is extremely lower than the ordinary bending resiliency of 7000 kg/cm$^2$ The material having the low bending resiliency is too soft so that a large difference in the hardness is produced between the door substrate 80 and its peripheral hard instrument panel 82. As a result, a difference in the hardness occurs between the surface of the air bag door portion 86 and that of its surrounding general portion. This gives a sense of incongruity in touch of the surface.

SUMMARY OF THE INVENTION

The present invention has been accomplished in order to solve the above problems.

An object of the present invention is to provide a structure of an air bag door portion with good appearance which is integrally formed to an instrument panel, can open smoothly to suppress the deformation of the instrument panel when the air bag expands and will not sink when pushed from the surface side of the door portion.

The first invention relates to a structure of an air bag door portion being pushed when an air bag accommodated in an air bag case on the back of the air bag door opening expands so that it is opened at a hinge of one side of a door substrate comprising:

the door substrate disposed in the air bag door opening defined in an instrument panel substrate;

a surface member; and a foam member molded between the door substrate and the instrument panel substrate and the surface member, wherein the door substrate includes:

a door substrate body formed such as a plate;

a peripheral flange formed on an outer periphery of the door substrate body;

a hinging piece protruding from the back of the outer periphery of the door substrate body so as to correspond to one side of the air bag case;

an attaching piece protruding from the back of the outer periphery of the door substrate body so as to correspond to at least one of the remaining sides of the air bag case;

a hinging side sandwiching piece extended outwardly and formed on the back of the peripheral flange on the side of the hinge wall or the side wall of the hinge piece, the hinging side sandwiching piece constituting a hinging side sandwiching portion between the hinging side sandwiching piece and the back of the peripheral flange;

a fragile portion for breakage at the stem of the attaching wall; and an attaching side sandwiching piece formed on the side wall of the attaching piece, the attaching side sandwiching piece constituting an attaching portion between the attaching side sandwiching piece and the back of the peripheral flange, wherein the peripheral edge of the air bag door opening is sandwiched by the hinging side sandwiching portion and the attaching side sandwiching portion, wherein the hinging piece is secured to the air bag case.

The second invention relates to a structure of an air bag door portion wherein the attaching wall is removed.

The third invention relates to a method of manufacturing an air bag door portion integrally to an instrument panel, the air bag door portion being pushed when an air bag accommodated in an air bag case on the back of the instrument panel expands so that it is opened, comprising the steps of:

preparing a door substrate including a plate-like door substrate body, a peripheral flange formed on the outer periphery of the door substrate body, a hinging wall protruding from the back of the outer periphery of the door substrate body so as to correspond to one side of the air bag case and an attaching wall protruding from the back of the outer periphery of the door substrate body so as to correspond to at least one of the remaining sides of the air bag case, and including a hinging side outward-extending sandwiching piece formed on the back of the peripheral flange on the side of the hinging wall or the side wall of the hinge piece and constituting a hinging side sandwiching portion between itself and the back of the peripheral flange, and a fragile portion for breakage at the stem of the attaching wall and an attaching side sandwiching piece formed on the side wall of the attaching piece and constituting an attaching portion between itself and the back of the peripheral flange, the hinging wall having an air bag case securing portion;

arranging an air bag door opening of an instrument panel substrate so that the periphery of the air bag door opening is sandwiched by the hinging side sandwiching portion and the attaching side sandwiching portion;

setting the instrument panel substrate, door substrate and surface member in a foaming molding die;

injecting a foaming material between the instrument panel and door substrate and the surface member; and molding a foam member.

The fourth invention relates to the method in the third invention, further comprising the step of, after molding the foam member, breaking the fragile portion for breakage at the stem of the attaching wall so that the attaching wall is separated.

The fifth invention relates to a structure of an air bag door portion being pushed when an air bag accommodated in an air bag case on the back of an air bag door opening expands so that it is opened at a hinge of one side of a door substrate, the air bag door portion comprising:

a door substrate disposed in an air bag door opening formed in an instrument panel substrate;

a surface member; and a foam member molded between the door substrate and instrument panel substrate and the surface member, wherein the door substrate includes:
a square door substrate body formed such as a plate, one side of which constitutes a hinging side;
an air bag attaching wall protruding from the vicinity of the peripheral edge of the back of at least one of the remaining three walls except the hinging side of the door substrate body, the air bag case attaching wall having a fragile portion for breakage at the stem of the air bag case attaching wall;
an attaching side sandwiching piece formed on the side wall thereof, the attaching side sandwiching piece constituting an attaching portion between the attaching side sandwiching piece and the back of the outer periphery of the substrate body,
wherein a side of the door substrate body on its hinging side is secured to the peripheral edge of the air bag door opening and air bag case, the peripheral edge of the air bag door opening is sandwiched by the sandwiching wall, and the air bag attaching wall is secured to the air bag case.

DETAILED DESCRIPTION OF THE PRESENT INVENTION

Figure 1:
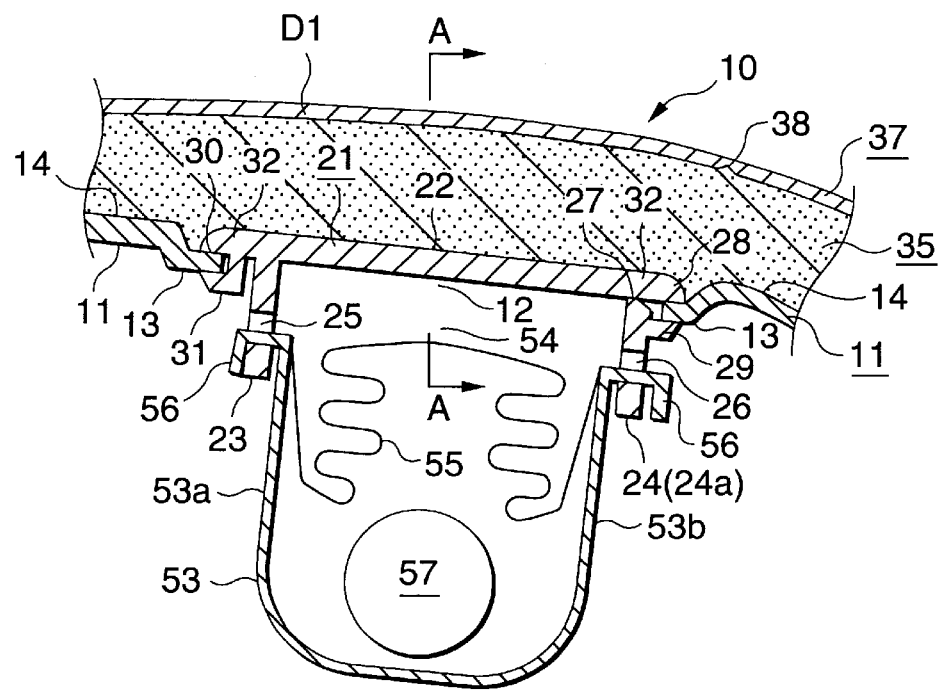
FIG. 1 is a sectional view of an air bag door portion according to an embodiment of the first invention.
Figure 2:
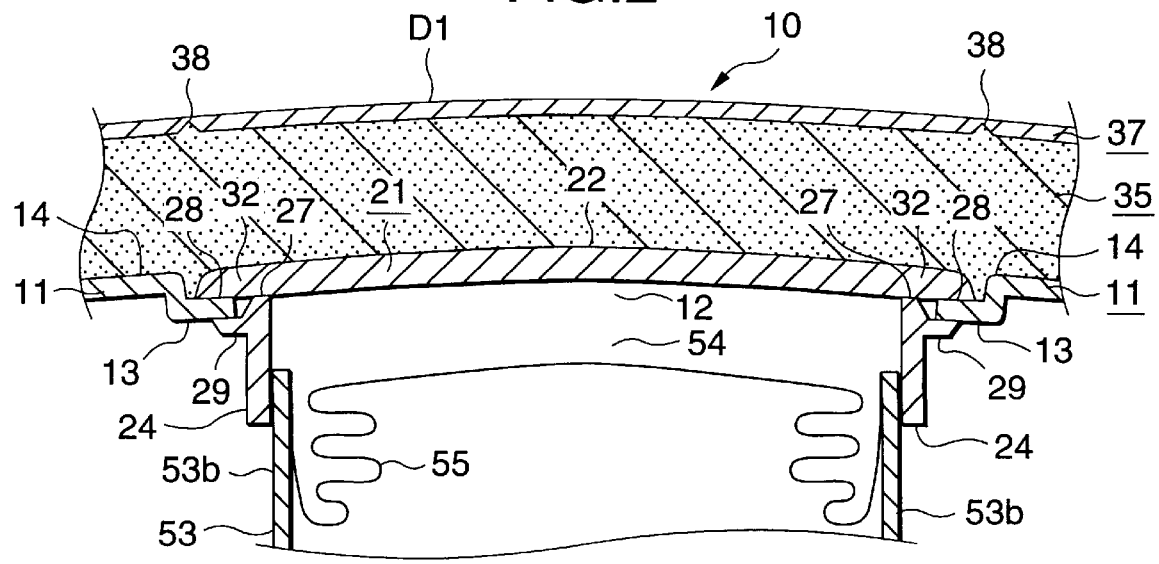
FIG. 2 is a sectional view taken in line A—A in FIG. 1.
Figure 3:
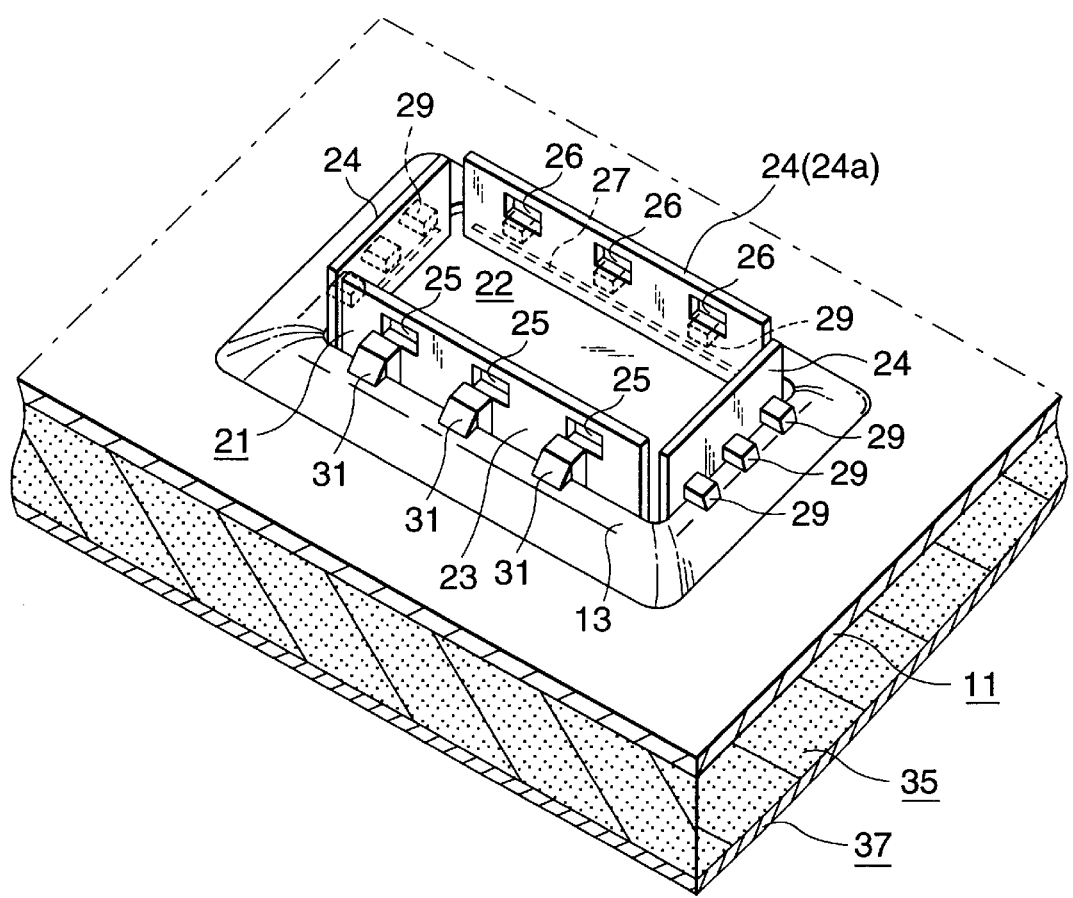
FIG. 3 is a perspective view of the back of the air bag door portion of FIG. 1 with an air bag case being detached.
Figure 4:
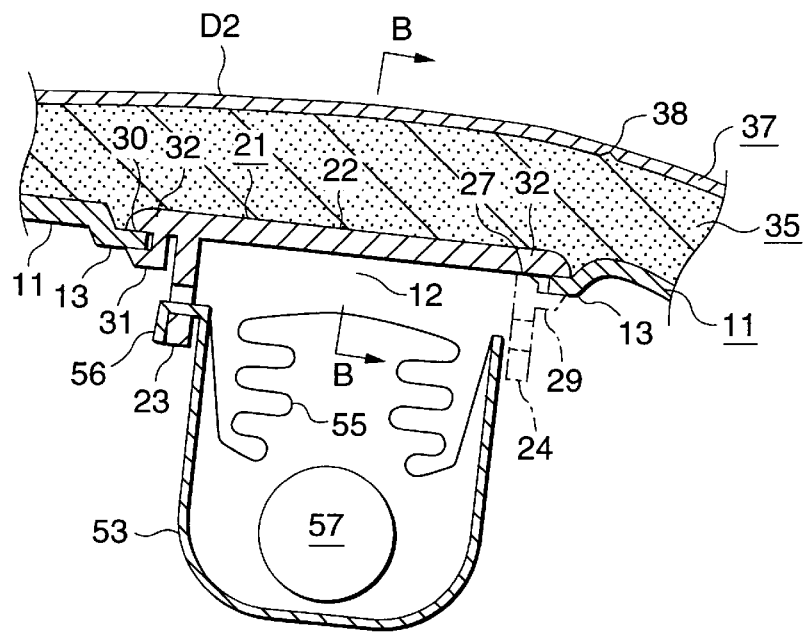
FIG. 4 is a sectional view of an air bag door portion according to an embodiment of the second invention.
Figure 5:
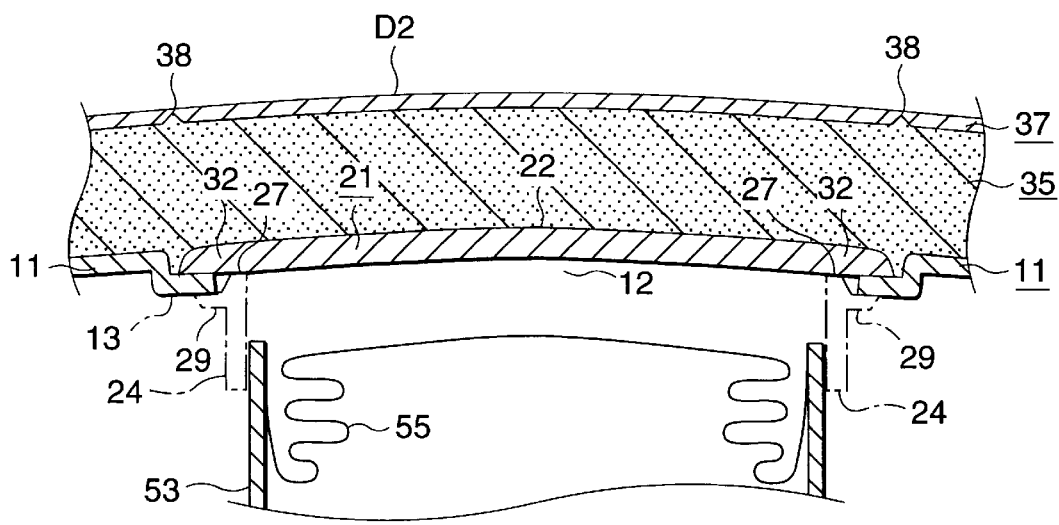
FIG. 5 is a sectional view taken in line B—B in FIG. 4.
Figure 6:
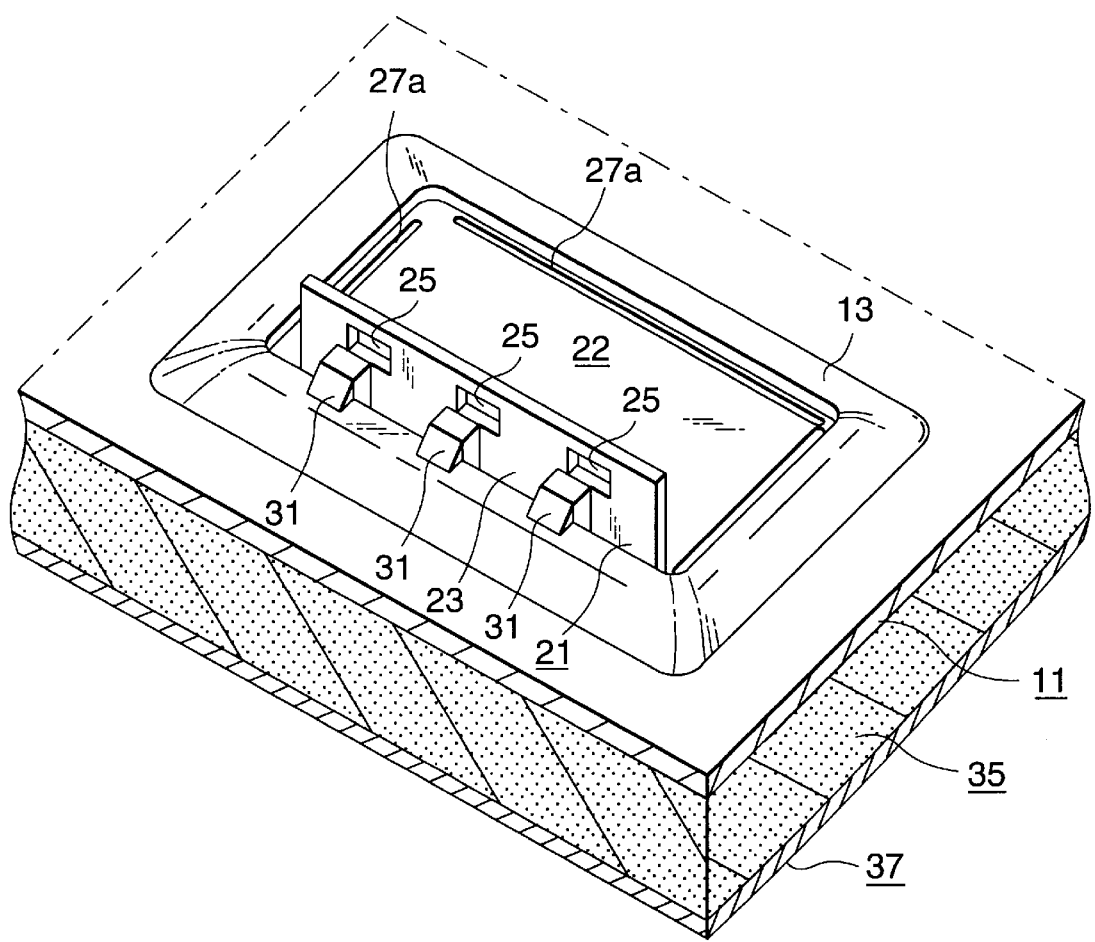
FIG. 6 is a perspective view of the back of the air bag door portion of FIG. 4 with an air bag case being detached.
Figure 7:
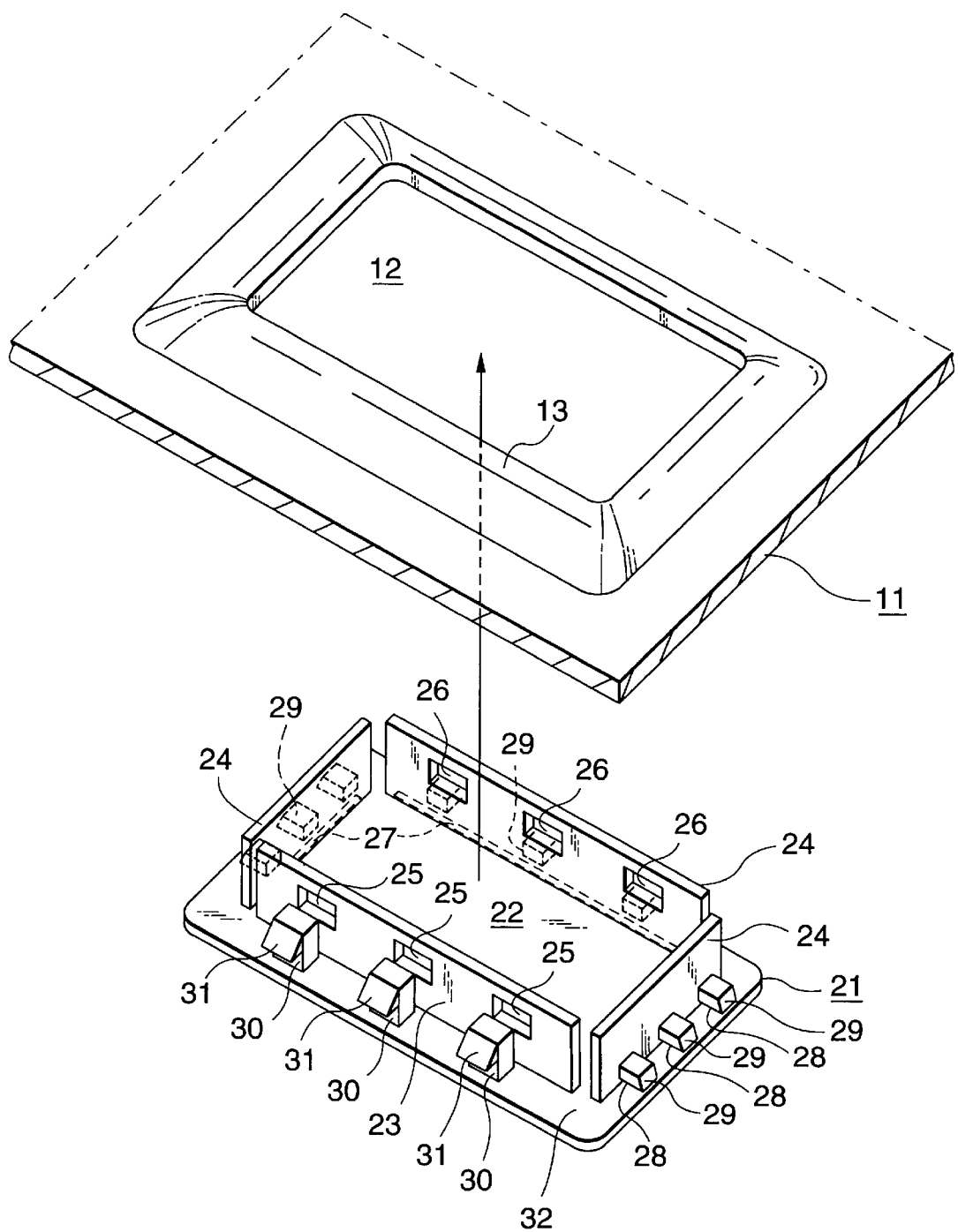
FIG. 7 is a perspective view of a door material body and an instrument panel material in an embodiment of the third invention.
Figure 8:
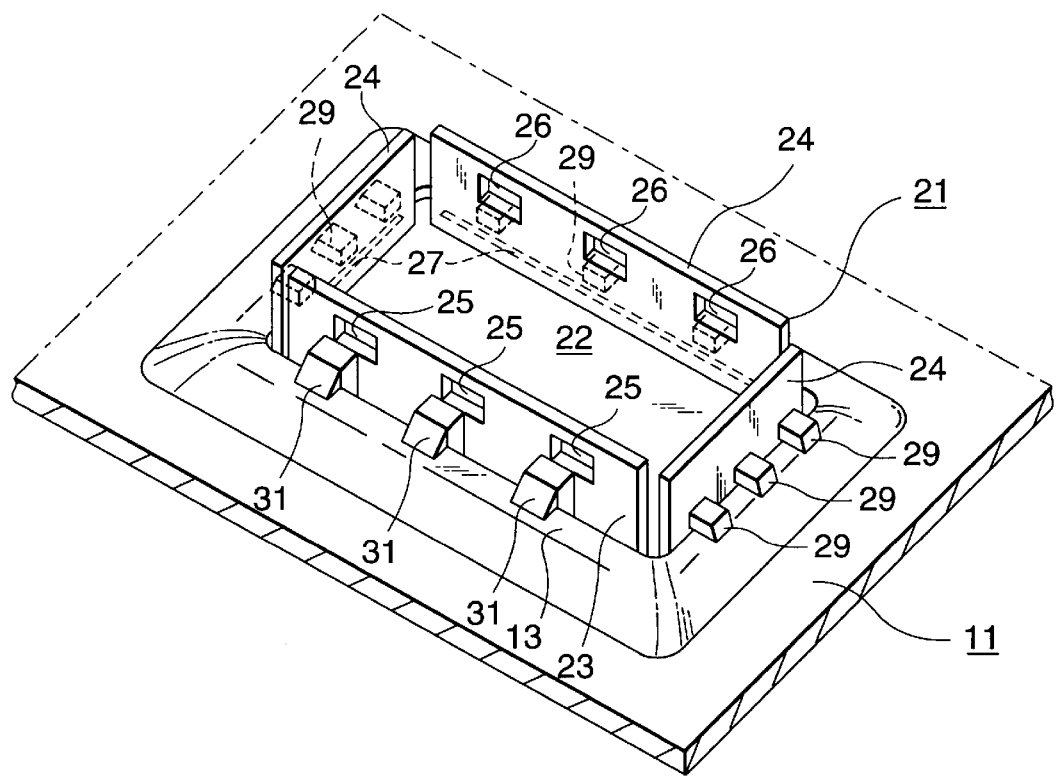
FIG. 8 is a perspective view of the instrument panel substrate after the door substrate is set.
Figure 9:
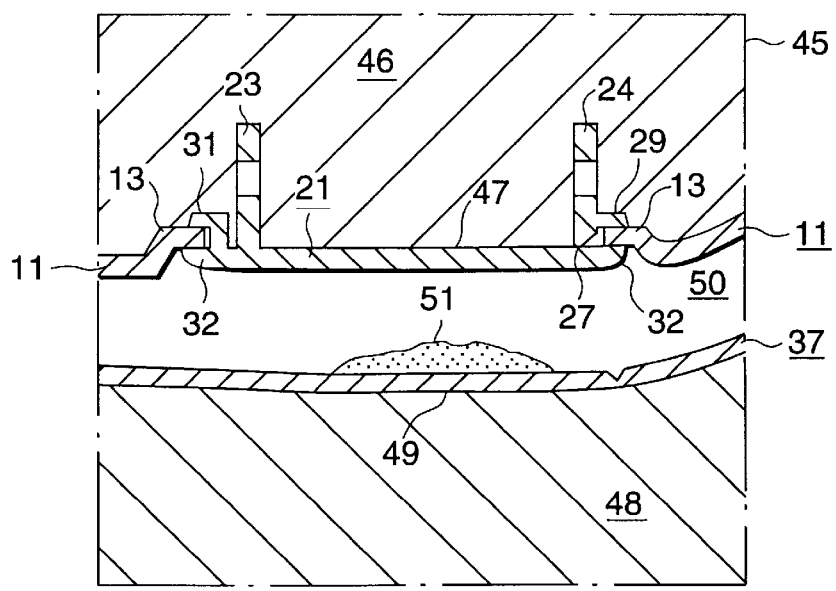
FIG. 9 is a sectional view of a foaming mold when foam is formed.
Figure 10:
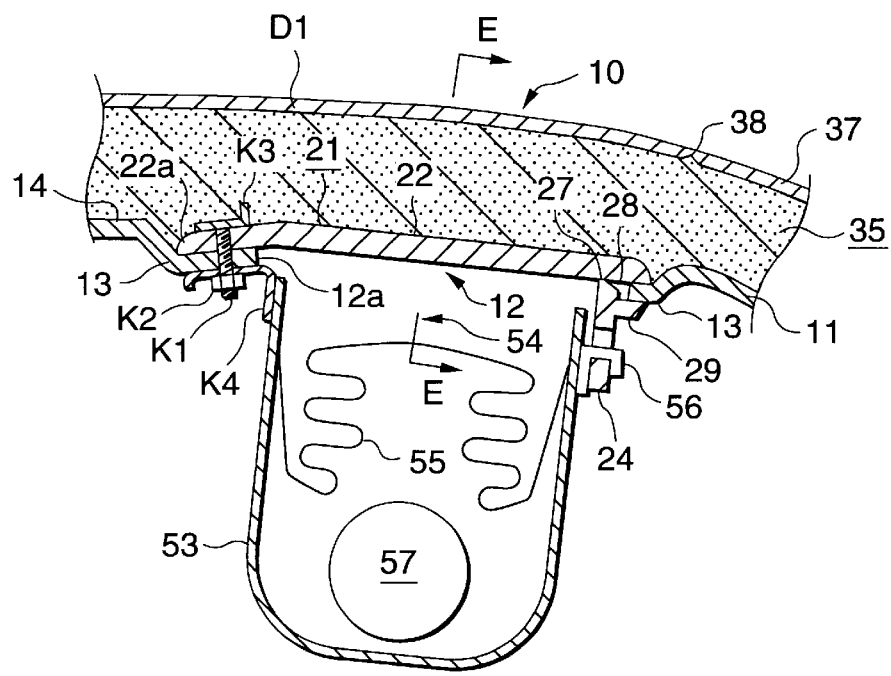
FIG. 10 is a sectional view of an air bag door portion according to an embodiment of a fifth invention.
Figure 11:
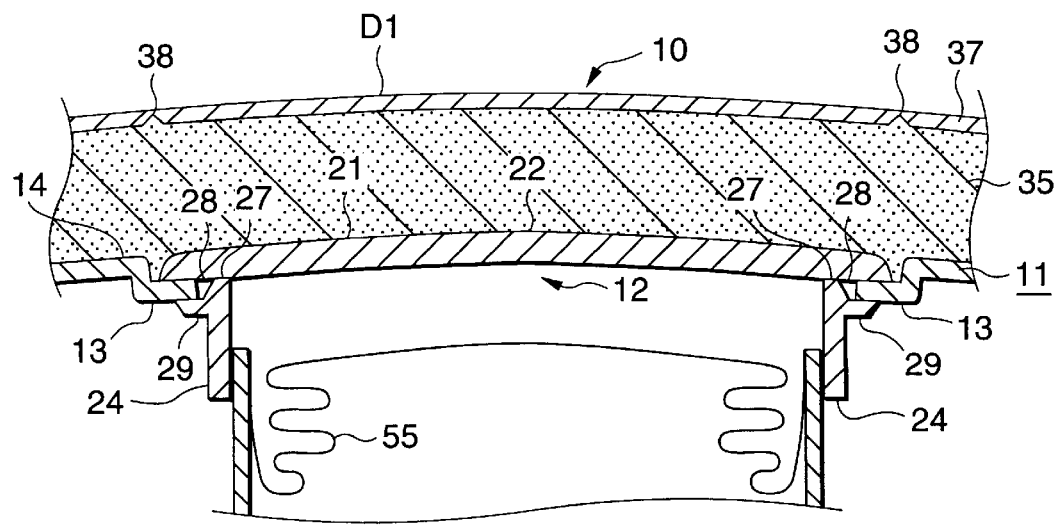
FIG. 11 is a sectional view taken in line E—E in FIG. 10.
Figure 12:
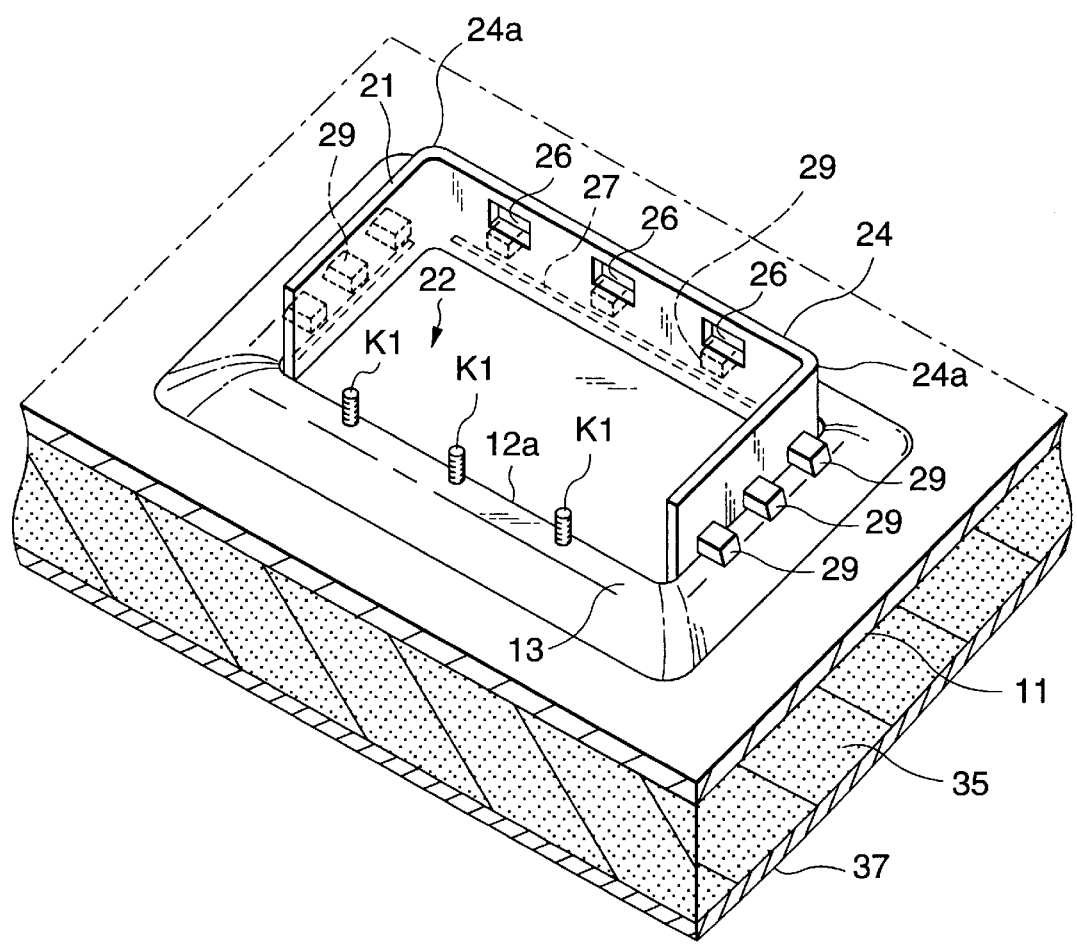
FIG. 12 is a perspective view of the back of the air bag door portion of FIG. 10 with an air bag case being detached.
Figure 13:
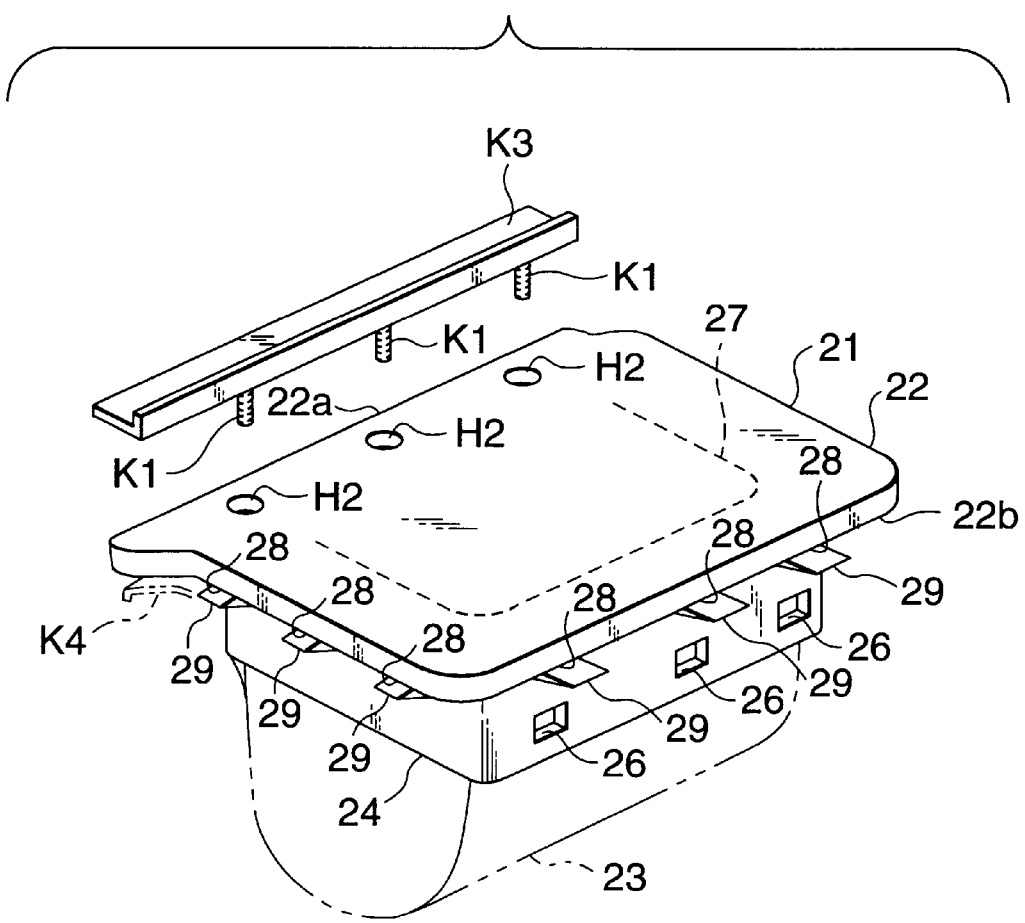
FIG. 13 is a perspective view of an example of a door substrate.
Figure 14:
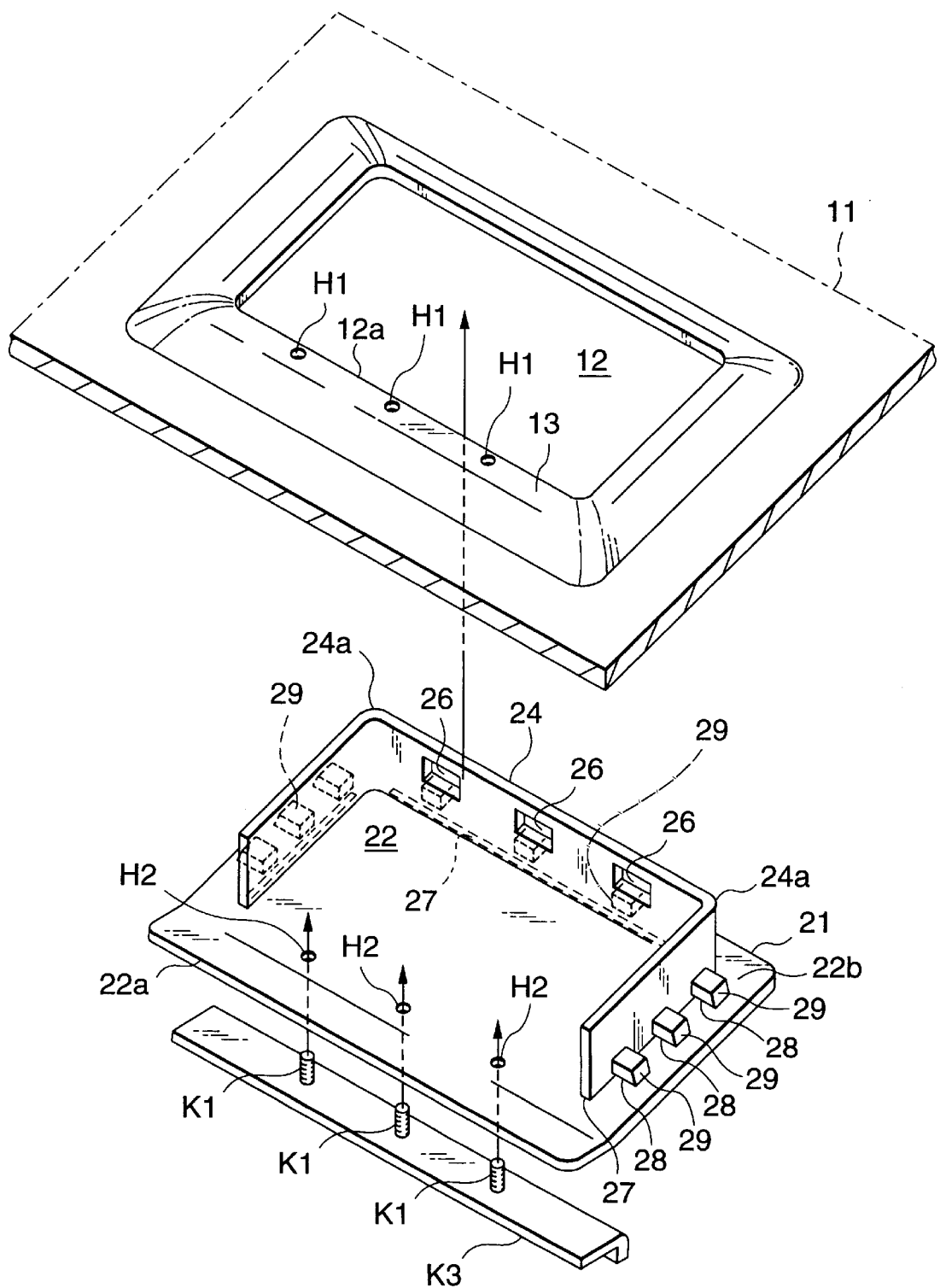
FIG. 14 is a sectional view of a door substrate and an instrument panel member.
Figure 15:
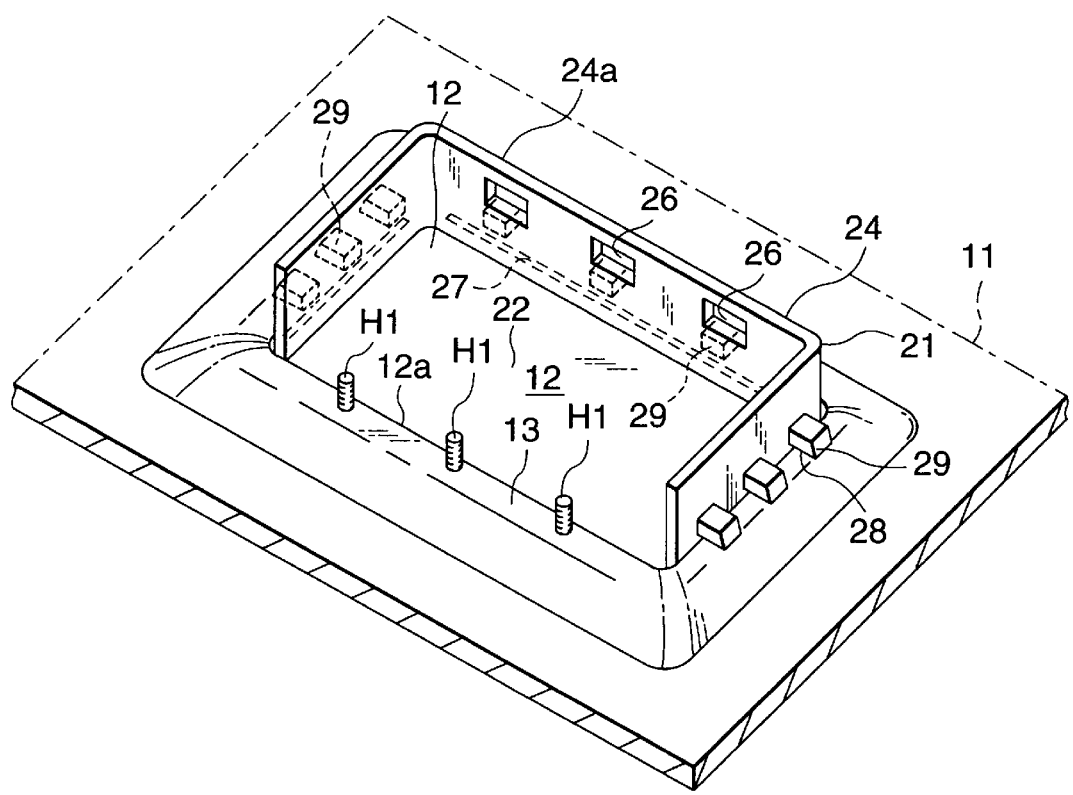
FIG. 15 is a perspective view after the door substrate is set.
Figure 16:
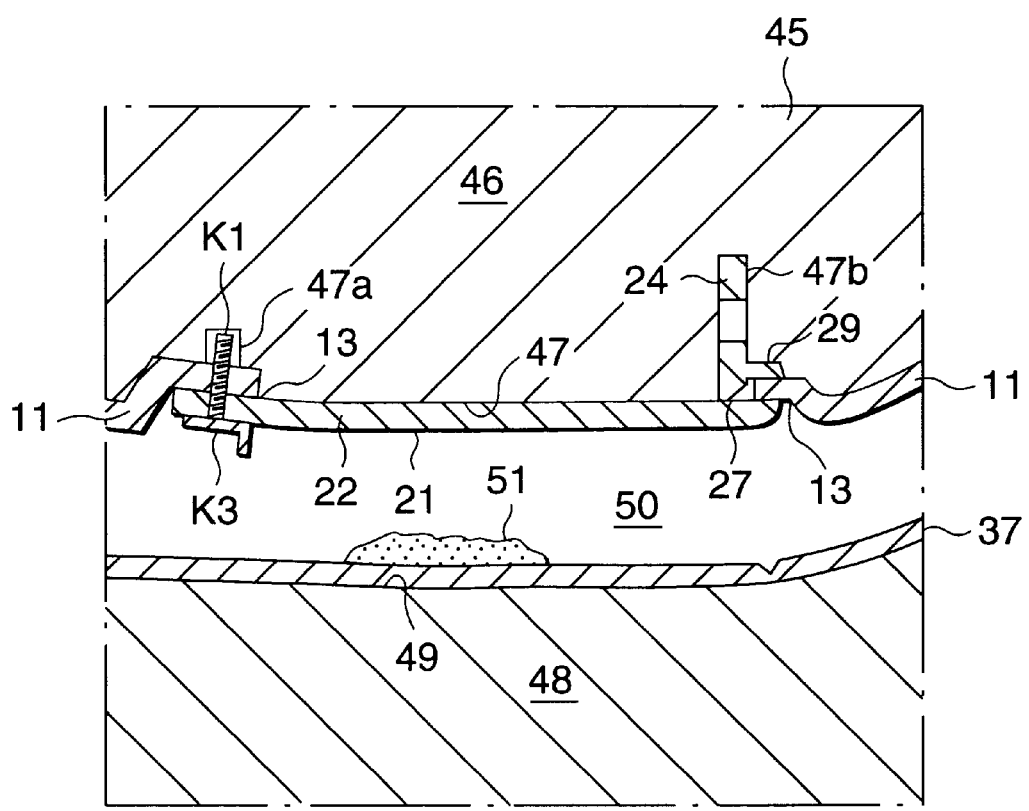
FIG. 16 is a sectional view of a foaming mold when foam is formed.
Figure 17:
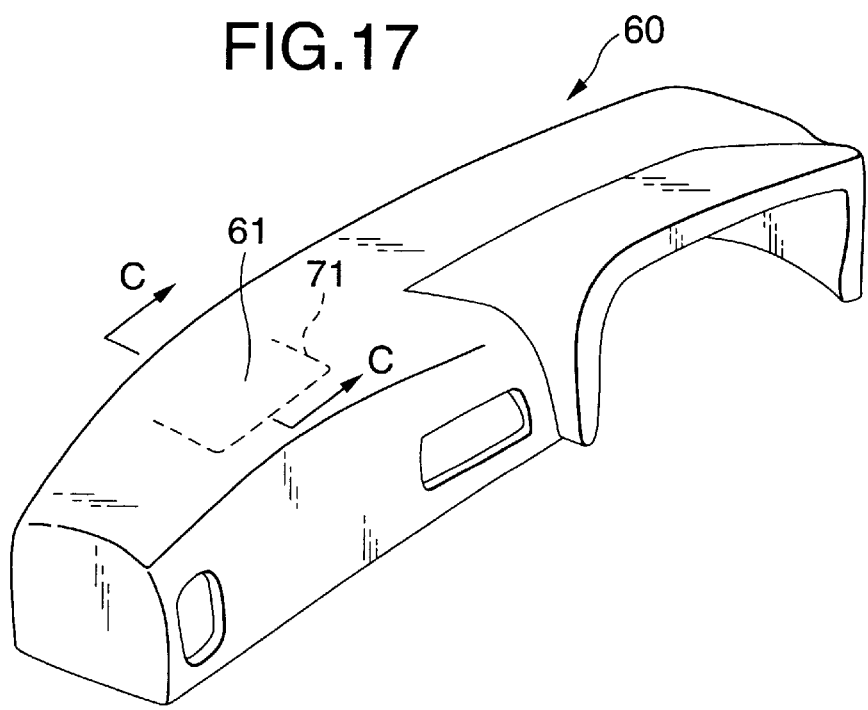
FIG. 17 is a perspective view of an instrument panel integrally provided with an air bag door portion.
Figure 18:
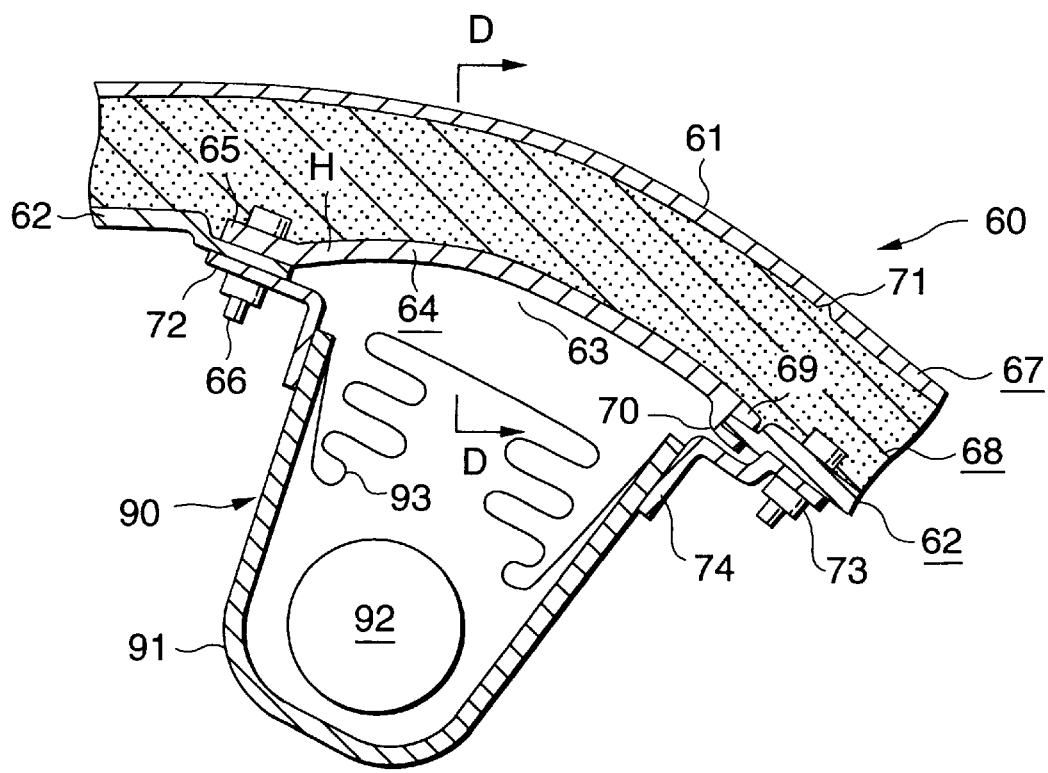
FIG. 18 is a sectional view taken in line C—C in FIG. 17.
Figure 19:
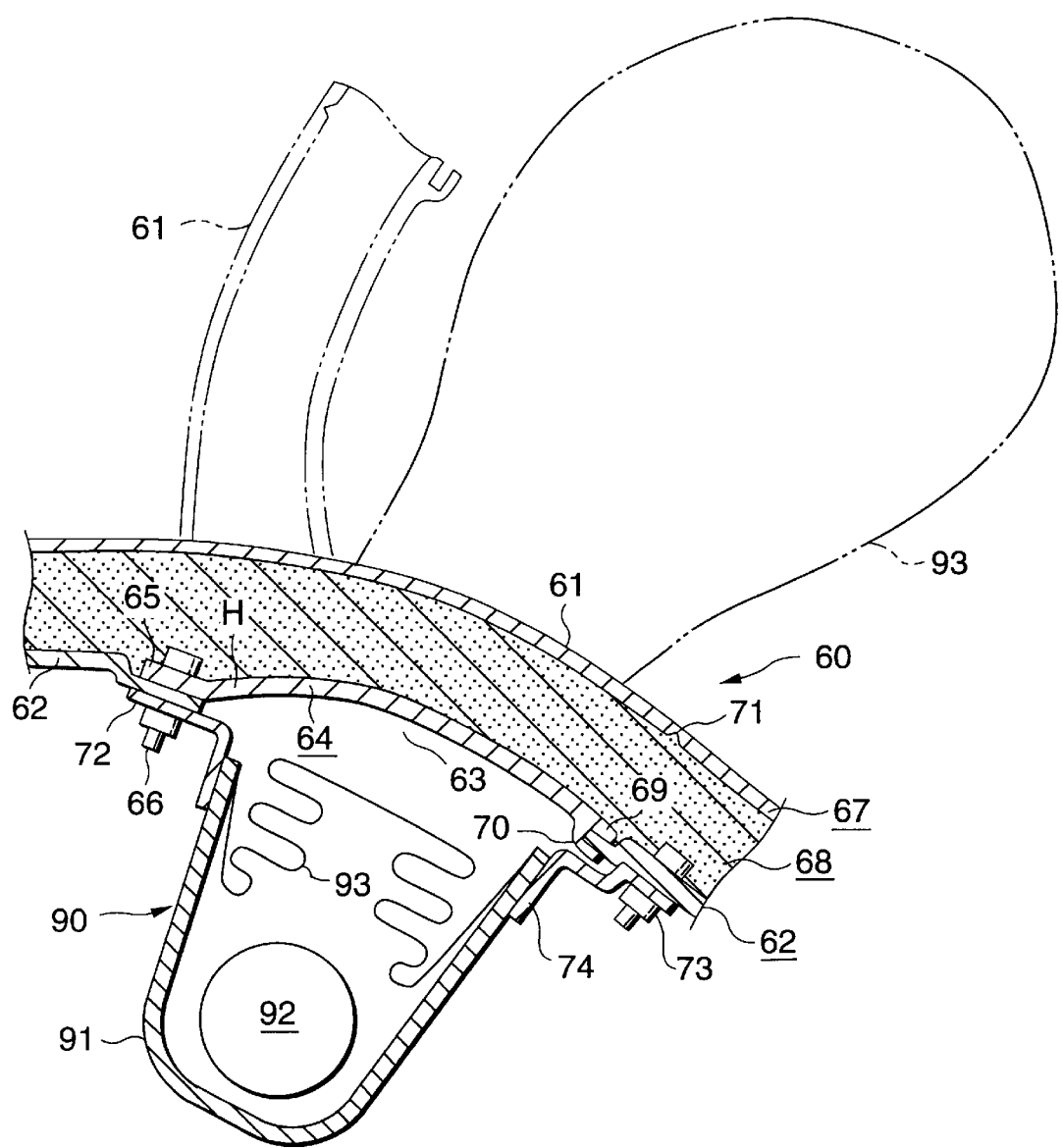
FIG. 19 is a sectional view showing the state where an air bag expands.
Figure 20:
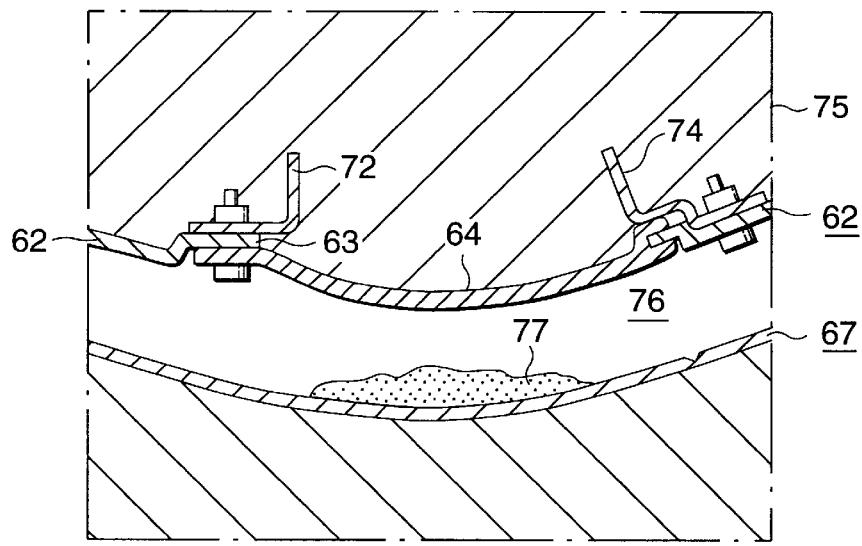
FIG. 20 is a sectional view showing the manner of manufacturing a conventional air bag.
Figure 21:
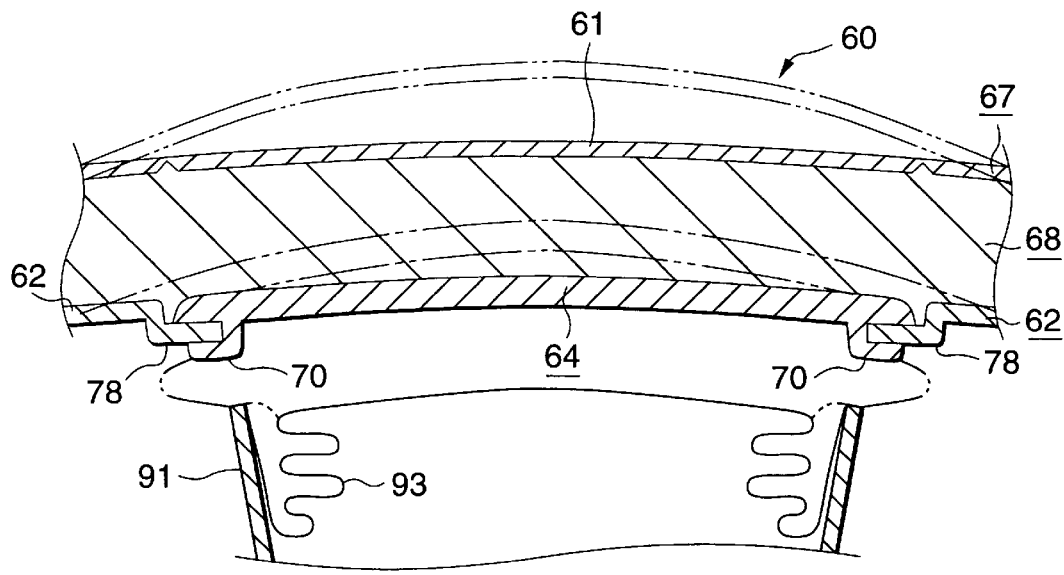
FIG. 21 is a sectional view taken in line D—D in FIG. 18.
Figure 22:
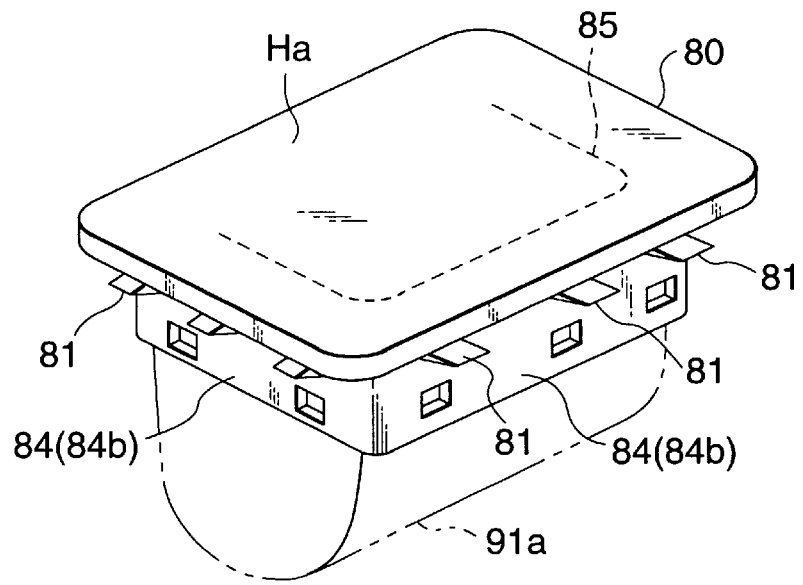
FIG. 22 is a perspective view of another conventional air bag door portion.
Figure 23:
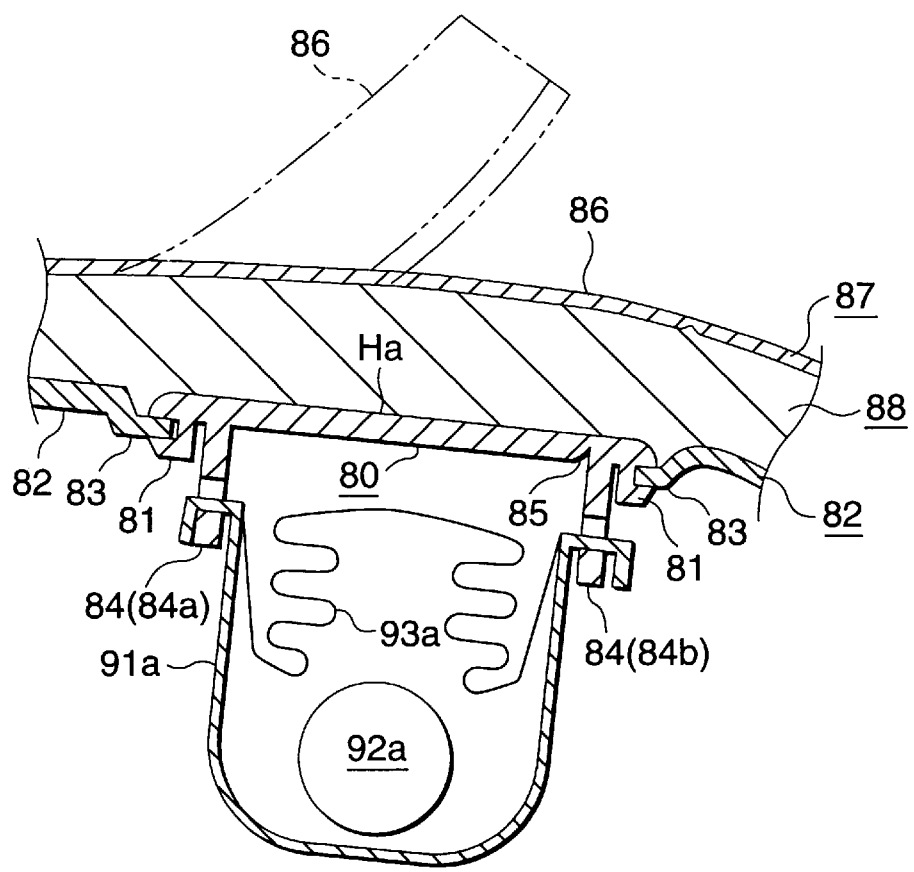
FIG. 23 is a sectional view of the air bag door portion having a door substrate shown in FIG. 22.

Now referring to the drawings, an explanation will be given of the present invention. FIG. 1 is a sectional view of an air bag door portion according to an embodiment of the first invention; FIG. 2 is a sectional view taken in line A—A in FIG. 1; FIG. 3 is a perspective view of the back of the air bag door portion of FIG. 1 with an air bag case being detached; FIG. 4 is a sectional view of an air bag door portion according to an embodiment of the second invention; FIG. 5 is a sectional view taken in line B—B in FIG. 4; FIG. 6 is a perspective view of the back of the air bag door portion of FIG. 4 with an air bag case being detached; FIG. 7 is a perspective view of a door substrate body and an instrument panel material in an embodiment of the third invention; FIG. 8 is a perspective view of the instrument panel substrate after the door substrate is set; FIG. 9 is a sectional view of a foaming mold when a foam is formed; FIG. 10 is a sectional view of an air bag door portion according to an embodiment of a fifth invention; FIG. 11 is a sectional view taken in line E—E in FIG. 10; FIG. 12 is a perspective view of the back of the air bag door portion of FIG. 10 with an air bag case being detached; FIG. 13 is a perspective view of an example of a door substrate; FIG. 14 is a sectional view of a door substrate and an instrument panel member; FIG. 15 is a perspective view after the door substrate is set; and FIG. 16 is a sectional view of a foaming mold when a foam is formed.

The instrument panel shown in FIGS. 1 to 3 is composed of an instrument panel substrate 11, a door substrate 21, a foam member 35 and surface member 37. The instrument panel has an air bag door portion D1 formed integrally which is located at a prescribed position. The surface of the air bag door portion D1 has the same shape as that of the instrument panel 60 shown in FIG. 10. An air bag case 53 is attached to the back of the air bag door portion D1. The air bag case 53, in which an air bag 55 is accommodated in a folded manner, has a rectangular opening, and secured to a reinforcement member of a car (not shown). Reference numeral 57 denotes an inflator for expanding the air bag 55.

The instrument panel substrate 11 is provided to give prescribed strength to the instrument panel 10 and is made of suitable hard resin. As seen from FIG. 7, the air bag door opening 12 is formed at a prescribed portion. The air bag door opening 12 is provided so that the air bag 55 accommodated within the air bag case 53 on the back of the instrument panel 10 can be developed into the vehicle chamber on the surface side of the instrument panel when the air bag 55 expands due to the collision of a motor car. The air bag door opening has a size corresponding to that of the air bag case 53. The air bag door opening 12 has a rectangular shape. The periphery 13 of the opening sinks toward the back of the instrument panel member 11 through a step so that the door substrate 21 does not protrude from the surface 14 of the instrument panel substrate 11 when it is disposed in the opening 12.

The door substrate 21 is provided to reinforce the back of the air bag door D1 so that the air bag door portion D1 can be smoothly opened when the air bag 55 expands and also to prevent the air bag door portion D from sinking when the surface of the air bag door portion D1 is pushed from an occupant or others. The door substrate 21 is made of hard resin. The door substrate 21, as seen from FIG. 7, is composed of a planar door substrate body 22 and its peripheral flange 32.

The door substrate body 22 may be a plate having a shape which is smaller than the air bag opening 12 and larger than the upper opening 54 of the air bag case 53. On the other hand, the peripheral flange 32 is extended outward from the door substrate body 22 and has a size enough to be installed on the surface of the periphery 13 of the air bag door opening 12. The door substrate body 22 is provided, on its back, with a hinging wall 23 protruding to correspond to a side 53a of the air bag case 53 and an attaching wall 24 protruding to correspond to at least one of the remaining sides 53b of the air bag case 53. In this embodiment, a single hinging wall 23 and three attaching walls 24 encircle the outer periphery of the opening 54 of the air bag case 53. Unlike this embodiment, the hinging wall 23 and attaching walls 24 may not be completely separated, but may be formed in an integral frame shape, or may have a partial recess therebetween. The hinging wall 23 and attaching wall 24 have a length enough to reach the side of the air bag case 53. The hinging wall 23 and attaching wall 24a opposite thereto are provided with hole-shaped securing portions 25 and 26 formed at regular intervals, respectively. Securing pieces 56 formed outward at the upper ends of the air bag case 53 are inserted into and secured to these securing portions 25 and 26. Incidentally, in order to promote the workability of securing the air bag 53, the securing portion 26 of the attaching wall 24a may be provided at one of the attaching walls 24, preferably attaching wall 24a opposite to the hinging wall 23. It is of course that the securing portion 26 may be provided at all the attaching walls 24, otherwise may not be provided entirely.

At the stem of the attaching wall 24, or boundary between itself and the door substrate body 22 in this embodiment, a fragile potion 27 for breakage is formed in a shape of a groove or slit. The fragile portion 27 is provided to break when the back of the air bag door portion D1 is pushed due to the expansion of the air bag 55, thereby separating the attaching wall 24 together with a sandwiching piece 29 (described later) from the door substrate 21. In the first invention, this permits smooth opening of the air bag door portion D1. On the other hand, in the manufacturing method according to the second and fourth inventions, this permits the attaching wall 24 to be removed before the instrument panel is attached to a car body. The outer side of the attaching wall 24 is provided with a sandwiching piece 29 extending outward which constitutes a sandwiching portion 28 on the attaching side between itself and the back of the outer peripheral flange portion 32. The sandwiching portion 28 is sized to bring the peripheral flange 32 into intimate contact with the surface of the periphery 13 of the air bag door opening 12.

On the other hand, on the back of the peripheral flange portion 32 on the side of the hinging wall 23 or outside of the hinging wall 23 is provided with a sandwiching piece 31 extending outward which constitutes a sandwiching portion 30 on the hinging side between itself and the back of the outer peripheral flange portion 32. In this embodiment, the sandwiching piece 31 on the hinging side is formed in an L-shape on the back of the peripheral flange 32 on the side of the hinging wall 23, but should not be limited to such a shape. Incidentally, the sandwiching portion 30 is sized to bring the outer peripheral flange 32 into intimate contact with the surface of the periphery 13 of the air bag door opening 12.

The door substrate 21 having such a structure as described above is attached to the instrument panel substrate 11 to cover the air bag door opening 12 in such a manner that the outer peripheral flange portion 32 is placed on the peripheral edge 13 of the air bag door opening 12 so that the peripheral edge 13 is sandwiched by the sandwiching portions 30 and 28 on the sides of the hinging and attaching.

The foam member 35 serves to give cushioning to the surface of the instrument panel. The foam member 35 is formed integrally to the surface of the door substrate 21 and that of the general portion of the instrument panel around it. The foam 35 is made of an elastic foam and formed by foaming a liquid foaming material between the surface of the instrument panel substrate 11 and the surface member 37.

The surface member 37 serves to protect the surface of the foam 35 to enhance the decoration and is made of a resin sheet or fabric. A breakage scheduling portion 38 is formed in the surface member 37. The breakage scheduling portion 38 defines an air bag door portion D so as to the periphery of the door substrate 21. The breakage scheduling portion 38 is provided so that the surface member 37 can be easily broken at the edge of the air bag door portion D1 when the air bag 55 expands, thereby smoothly opening the air bag door portion D1. The breakage scheduling portion 38 is formed in a notch or slit shape to decrease the strength.

When the instrument panel 10 is attached to the car body, the securing pieces 56 of the air bag case 55 are inserted into and secured to the securing portions 25 and 26 of the hinging wall 23 and attaching wall 24 of the door substrate 21 so that the air bag case 55 is disposed on the back of the air bag door portion D1. In assembled state, the peripheral flange 32 of the door substrate 21 is located on the surface of the peripheral edge 13 of the air bag door opening 12, and the sandwiching portions 28 and 30 on the sides of attaching and hinging piece the peripheral edge 13 of the air bag door opening 12 so that the door substrate 21 is supported by the peripheral edge 13. Therefore, when the surface of the air bag door portion D1 is pushed by an occupant or others, the pushing force can be absorbed by the door substrate 21. In addition, the fragile portion 27 for breakage is located at the attaching wall 24 but not at the door substrate body 22 and peripheral flange 32. Therefore, the door substrate body 22 and peripheral flange 32 are difficult to be fractured or broken because of the pushing force from the side of the surface of the air bag door portion D1, and hence the surface of the air bag door portion D1 will not sink. For this reason, in order to prevent the breakage, the door substrate 21 is not required to be made of a special material having low rigidity and resiliency. Thus, the surface of the air bag door portion may not be softer than its surrounding general portion. This does not give a sense of incongruity.

On the other hand, when the inflator 57 operates by shock applied to the car body and the air bag 55 expands, the door substrate 21 is pushed by the expanding air bag 55 from the back. Thus, stress is concentrated to the fragile portion 27 at the stem of the attaching wall 24 so that the fragile portion 27 for breakage is broken. As a result, the door substrate 21 exclusive of the side of the hinging wall 23 is separated from the instrument panel substrate 11. The door substrate 21 is bent toward the foam 35 at a fulcrum of the hinging wall 23. Then, the foam 35 is broken along the peripheral edge of the door substrate 21, and the surface member 37 is broken at the breakage scheduling portion 38. Thus, the air bag door portion D1 is opened into the vehicle chamber so that the air bag 55 is smoothly developed into the vehicle chamber.

The air bag door portion D2 according to the second invention shown in FIGS. 4 to 6 is structured so that the attaching wall 24 of the door substrate 21 shown in FIGS. 1 to 3 is broken at the fragile portion 27 at its stem and removed together with the sandwiching piece 29 on the attaching side. The remaining structures are the same as those in the previous embodiment. Specifically, in the air bag door portion D2, the peripheral edge 13 of the air bag door opening 12 is sandwiched by the sandwiching portion 30 on the side of the hinging wall 23 of the door substrate 21, and the peripheral flange 32 is only placed on the surface of the peripheral edge 13 of the opening in the area exclusive of the hinging wall 23. Incidentally, it should be noted that the attaching wall 24 is removed before the air bag case 53 is attached to the instrument panel 40.

In a assembled state, the peripheral flange 32 of the door substrate 21 is located on the surface of the peripheral edge 13 of the air bag door opening 12 so that the door substrate 21 is supported by the peripheral edge 13. Therefore, the pushing force on the surface of the air bag door portion D2 applied from the side of the vehicle chamber can be absorbed by the door substrate 21. In addition, the fragile portion 27 for breakage is not located at the door substrate 21 and peripheral flange 32. Therefore, the door substrate 21 is not easily broken and hence the surface of the air bag door portion D2 will not sink.

When the air bag 55 expands, the door substrate 21 is bent toward the foam member 35 at a fulcrum of the hinging wall 23. Then, the foam member 35 is broken along the peripheral edge of the door substrate 21, and the surface member 37 is broken at the breakage scheduling portion 38. Thus, the air bag door portion D2 is opened.

An explanation will be given of an embodiment of a method of manufacturing an air bag door portion according to the third invention. In this embodiment, the instrument panel 11, door substrate 21 and surface member 37 which were adopted in the first invention will be used.

First, as shown in FIGS. 7 and 8, the hinging wall 23 and attaching walls 24 of the door substrate 21 are inserted from the surface side of the instrument panel substrate 11 into the air bag door opening 12 so that the peripheral edge 13 of the air bag door opening 12 is sandwiched by the sandwiching portions 28 and 30 on the side of hinging and attaching. Thus, the door substrate 21 is disposed on the air bag opening 12 of the instrument panel substrate 11, and the peripheral flange 32 of the door substrate 21 is placed on the surface of the peripheral edge 13 of the air bag opening 12. In this case, the attaching walls 24 are inserted into the air bag door opening 12 while they are elastically deformed inwardly by a predetermined amount so that the sandwiching pieces 29 and 31 on the sides of attaching and hinging are inserted to reach the back of the air bag door opening and secured to the surface of the peripheral edge 13 thereof. The sandwiching pieces 29 and 31 have a length enough to pass through the air bag door opening 12 by elastic deformation. This length is suitably determined in accordance with the length, elasticity, etc. of the attaching walls 24. Thus, in the air bag opening 12 with the door substrate 21 disposed, by the sandwiching portions 28 and 30 of the door substrate 21, the peripheral flange portion 32 is brought into intimate contact with the surface of the peripheral edge 13 of the air bag door opening 12 so that the peripheral edge 13 is surely sealed.

The instrument panel substrate 11, in which the door substrate 21 is set in the air bag door opening 12, is disposed, together with the door substrate 21, on the mold surface 47 of an upper die 46 of a foam-molding die 45. The surface member 37 is disposed on the mold surface of a lower die 48.

The foam-molding die 45 to be used has a cavity 50 for foam-molding having a shape corresponding to the instrument panel to be molded. In the upper die molding surface 47, concave portions, where the hinging wall 23 and attaching pieces 24 of the door substrate 21 are accommodated, are formed. The instrument panel substrate 11 and door substrate 21 can be held in the upper die molding surface 47 by a suitable techniques inclusive of a technique of inserting an attaching clip provided at a portion of the instrument panel substrate 11 into the securing piece formed in the upper die molding surface 47, or otherwise adsorbing the instrument panel substrate 11 onto the upper die mold surface using an absorbing means such as vacuum or magnet provided in the upper die mold surface 47.

Next, the liquid foaming material 51 such as polyurethane is injected into the back of the surface member 37 by a known injection technique for closed mold or injection technique for open cavity so that form is produced between the surface member 37 and instrument panel substrate 11. Using the adhesive property at this time, the foam 35 which is adhered to the surface member 37, instrument panel substrate 11 and door substrate 21 is formed. In this case, the peripheral edge 13 of the air bag door opening 12 is sealed in contact with the peripheral flange 32 of the door substrate 21 so that the leakage of the foaming material 51 can be prevented. Incidentally, the injection technique for closed mold is to inject the foaming material 51 after the foam-molding die 45 is closed. In this technique, a hole is previously made for injecting the foaming material into the upper die 46 and instrument panel substrate 11. On the other hand, the open injection technique is to inject the foaming material 51 with the foaming molding die 45 opened and thereafter close the die. The injection technique for closed mold or injection technique for open cavity is adopted in accordance with the reaction speed of the foaming material 51, size and shape of the product, etc.

Upon completion of foaming the foaming material 51, the foam-molding die 45 is opened to make a molded product. Thus, the instrument panel 10 having the structure of the air bag door portion D1 according to the first invention can be manufactured.

In an embodiment according to the fourth invention, after the above molding, the fragile portion 27 for breakage at the stem of the attaching wall 24 is broken to cut out the attaching wall. Thus, the instrument panel 40 having the air bag door portion D2 according to the second invention as shown in FIGS. 4 to 6 can be manufactured.

Now referring to FIGS. 10–16, an explanation will be given of an embodiment according to the fifth invention. In these figures, like reference numerals refer to like elements in the first to fourth inventions.

In the fifth invention, an air bag door opening 12 has a side 12*a* to which the hinging side 22*a* of the door substrate 22 is secured. Along the side 12*a*, holes H1 are formed for attaching the door substrate 22.

The door substrate 22 has a rectangular shape having a size enough to close the air bag door opening 12 and to be disposed on the step on the periphery 13 of the opening. The one side, i.e. hinging side 22*a* of the door substrate 22 is secured to the securing side 12*a* of the air bag door opening 12. In this embodiment, attaching holes H2 are formed along the hinging side 22*a* of the door substrate body 22. In the instrument panel substrate 11, holes H1 for attaching the door substrate are formed in the vicinity of the securing side 12*a* of the air bag door opening 12. The door substrate 21 as well as the air bag case 53 is fixed to the instrument panel substrate 11 using bolts K1 and nuts K2 through the holes H2 and H1. Incidentally, the bolts K1 are formed integrally to a hinging-side holding metal fitting K3 of the door substrate 21. Further, on the side corresponding to the hinging side 22*a* of the door substrate body 22, a bracket K4 is welded to the air bag case 53. The bracket K4 is used to attach the instrument panel with the passing-through holes for bolts. The hinging side 22a of the door substrate body 22 can be secured to the air bag case 53 using not only the bolts K1 and nuts K2 but also another fixing or securing member.

On the back of the door substrate body 22, an air bag attaching wall 24 is protruded in the vicinity of at least one side of three sides exclusive of the hinging side 22a. In this embodiment, the attaching wall 24 is formed at the three sides exclusive of the hinging side 22a. The attaching wall 24 surrounds the three sides of the outer periphery of the opening 54 of the air bag case 53. The attaching wall 24 should not be limited to an integral body, but may be separated at corners 24a or may have recesses made at the corners 24a. The attaching wall 24 has a length enough to reach the side of the air bag case 53, and has holes 26 formed at regular intervals and used to attach the air bag case 53. Securing pieces 56, which are formed outward on the upper portion of the air bag case 53, are inserted into and secured to the air bag case attaching holes 26. Incidentally, in order to promote the workability of securing the air bag case 53, the attaching holes 26 are preferably provided on at least the attaching wall 24 opposite to the hinging side 22a, but may be provided at prescribed intervals over the entire attaching wall 24. In place of using the attaching piece for the air bag case 56, the attaching wall 24 may be secured to the air bag case using the other securing means such as a bolt.

At the stem of the attaching wall 24, in the vicinity of the boundary between the attaching wall 24 and the back of the door substrate body 22, the fragile portion 27 for breakage 27 is formed outward in a groove or slit shape. When the back of the air bag door portion D1 is pushed because of the expansion of the air bag 55, the fragile portion 27 is broken so that the attaching wall 24 as well as the sandwiching piece 27 is separated from the door substrate body 22, thereby smoothly opening the air bag door portion D1. From the outer side wall of the attaching wall 24, sandwiching pieces 29 extend outward which constitutes a sandwiching portion between itself and the back 22b of the door substrate body 22. The sandwiching portion 28 is sized to sandwich the peripheral edge of the air bag door opening 12, thereby bringing the periphery of the door substrate body 22 into intimate contact with the surface of the peripheral edge 13 of the air bag door opening 12.

When the instrument panel 10 is attached to a car body, the securing pieces 56 of the air bag case 55 is inserted into and secured to the attaching holes 26 of the attaching wall 24 of the door substrate 21, the bolts K1 of the hinging side are inserted into the holes of the bracket K4 of the air bag case 53 and the nuts K2 are screwed with the bolts K1. Thus, the air bag case 55 is disposed on side of the back of the air bag door portion D1. It should be noted that the air bag case 55 is secured to the vehicle body member such as a reinforcement member.

In a assembled state, the periphery of the door substrate 21 is located on the surface of the periphery of the air bag door opening 12 so that the door substrate 21 is supported by the peripheral edge 13 of the air bag door opening 12 by the sandwiching portion 28 and bolts K1 of the hinging side. Therefore, when the surface of the air bag door portion D1 is pushed by an occupant, the pushing force can be supported by the door substrate 21.

An explanation will be given of an embodiment of a method of manufacturing the air bag door portion according to the fifth invention.

First, as shown in FIGS. 14 and 15, with the holes H1 of the instrument panel substrate 11 and the holes H2 of the door substrate 21 aligned with each other, the attaching wall 24 of the door substrate 21 is inserted from the surface side of the instrument panel substrate 11 into the air bag door opening 12 so that the peripheral edge 13 of the air bag door opening 12 is sandwiched by the sandwiching portion 28 on the sides of hinging and attaching. Thus, the door substrate 21 is disposed on the air bag opening 12 of the instrument panel substrate 11, and the periphery of the door substrate 21 is placed on the surface of the peripheral edge 13 of the air bag door opening 12. In this case, the attaching wall 24 is inserted into the air bag door opening 12 while it is elastically deformed inwardly by a predetermined amount so that the sandwiching pieces 29 are inserted to reach the back of the air bag door opening 12 and secured to the surface of the peripheral edge 13 thereof. The sandwiching pieces 29 have a length enough to pass through the air bag door opening 12 by elastic deformation of the attaching wall 24. This length is suitably determined in accordance with the length, elasticity, etc. of the attaching wall 24. The bolts K1 of the metal fitting K3 disposed on the side of the front surface of the door substrate 21 are passed through the holes H2 of the door substrate 21 and the holes H1 of the instrument panel substrate 11.

Thus, in the air bag opening 12 with the door substrate 21 disposed, by the sandwiching portions 28 of the door substrate 21, the periphery of the door substrate 21 is brought into intimate contact with the surface of the peripheral edge 13 of the air bag door opening 12 so that the peripheral edge 13 is surely sealed.

As shown in FIG. 16, the instrument panel substrate 11, in which the door substrate 21 is set in the air bag door opening 12, is disposed, together with the door substrate 21, on the molding surface 47 of an upper die 46 of a foam-molding die 45. The surface member 37 is disposed on the molding surface of a lower die 48. The foam-molding die 45 to be used is a known integral foam-molding type die which has a cavity 50 located between the upper mold surface and lower mold surface and used for foam-molding having a shape corresponding to the instrument panel to be molded. In the upper die molding surface 47, concave portions 47a and 47b, where the bolts K1 of the metal fitting K3 and the attaching wall 24 are accommodated, are formed. The instrument panel substrate 11 and door substrate 21 can be held in the upper die molding surface 47 by a suitable techniques inclusive of a technique of inserting an attaching clip provided at a portion of the instrument panel substrate 11 into the securing piece formed in the upper die mold surface 47, or otherwise adsorbing the instrument panel substrate 11 onto the upper die molding surface using an absorbing means such as vacuum or magnet provided in the upper die molding surface 47.

Next, the liquid foaming material 51 such as polyurethane is injected into the back of the surface member 37 by a known injection technique for closed mold or injection technique for open cavity so that form is produced between the surface member 37 and instrument panel substrate 11. Using the adhesive property at this time, the foam member 35 which is adhered to the surface member 37, instrument panel substrate 11 and door substrate 21 is formed. In this case, the peripheral edge 13 of the air bag door opening 12 is sealed in contact with the peripheral flange 32 of the door substrate 21 so that the leakage of the foaming material 51 can be prevented. Incidentally, the injection technique for closed mold is to inject the foaming material 51 after the foam- molding die 45 is closed. In this technique, a hole is previously made for injecting the foaming material into the upper die 46 and instrument panel substrate 11. On the other hand, the open injection technique is to inject the foaming material 51 with the foaming molding die 45 opened and thereafter close the die. The injection technique for closed mold or injection technique for open cavity is adopted in accordance with the reaction speed of the foaming material 51, size and shape of the product, etc.

Upon completion of foaming the foaming material 51, the foam-molding die 45 is opened to make a molded product. Thus, the instrument panel 10 having the structure of the air bag door portion D1 shown in FIGS. 10 to 17 can be manufactured.

As described and illustrated above, in accordance with the structure of the air bag door portion according to this invention, the door substrate is secured to the air bag case and the air bag case is not directly secured to the instrument panel. For this reason, when the air bag expands, great deforming force is not applied to the peripheral edge of the air bag door opening in the instrument panel substrate. Therefore, the instrument panel is difficult to be broken. Further, the expansion pushing force of the air bag is effectively applied to the air bag door portion so that the air bag door portion can be opened.

In accordance with the present invention, the attaching piece for the air bag case is provided on at least one side of three sides exclusive of the hinging side of the door substrate body and the fragile portion for breakage is formed at the stem of the attaching piece so that the attaching piece is secured to the air bag case. For this reason, when the back of the door substrate is pushed due to the expansion of the air bag, the stress is concentrated to the fragile portion for breakage of the stem of the attaching piece so that the fragile portion is effectively broken. Thus, the air bag door portion is effectively opened.

In addition, the fragile portion 27 for breakage is not located at the door substrate body 22. Therefore, in a assembled state, the door substrate body is difficult to be fractured or broken because of the pushing force from the side of the surface of the air bag door portion, and hence the surface of the air bag door portion will not sink, thereby keeping the good appearance of the air bag door portion. Without using the substrate of a special material having low rigidity and resiliency, inconvenience when the air bag door surface is pushed, the sense of touch of the surface of the air bag door can be made similar to that the surrounding general portion. This does not give a sense of incongruity.

On the other hand, in accordance with the method of manufacturing the air bag door portion according to the present invention, the air bag door portion having the excellent features can be easily manufactured. In addition, the method, which can suppress the leakage of the foaming material when the foam member is molded, is excellent in economy and workability.

What is claimed is:

1. A structure of an air bag door portion being pushed when an air bag accommodated in an air bag case on the back of the air bag door opening expands so that it is opened at a hinge of one side of a door substrate, the air bag door portion comprising:

the door substrate disposed in the air bag door opening defined in an instrument panel substrate;

a surface member; and a foam member molded between the door substrate and the instrument panel substrate and the surface member, wherein the door substrate includes:

a door substrate body formed such as a plate;

a peripheral flange formed on an outer periphery of the door substrate body;

a hinging piece protruding from the back of the outer periphery of the door substrate body so as to correspond to one side of the air bag case;

an attaching piece protruding from the back of the outer periphery of the door substrate body so as to correspond to at least one of the remaining sides of the air bag case;

a hinging side sandwiching piece extended outwardly and formed on the back of the peripheral flange on the side of the hinge wall or the side wall of the hinge piece, the hinging side sandwiching piece constituting a hinging side sandwiching portion between the hinging side sandwiching piece and the back of the peripheral flange;

a fragile portion for breakage at the stem of the attaching wall; and an attaching side sandwiching piece formed on the side wall of the attaching piece, the attaching side sandwiching piece constituting an attaching portion between the attaching side sandwiching piece and the back of the peripheral flange, wherein the peripheral edge of the air bag door opening is sandwiched by the hinging side sandwiching portion and the attaching side sandwiching portion, wherein the hinging piece is secured to the air bag case.

2. A structure of an air bag door portion being pushed when an air bag accommodated in an air bag case on the back of the air bag door opening expands so that it is opened at a hinge of one side of a door substrate, the air bag door portion comprising:

the door substrate disposed in the air bag door opening formed in an instrument panel substrate;

a surface member; and a foam member molded between the door substrate, the instrument panel substrate and the surface member, wherein the door substrate includes:

a door substrate body formed such as a plate;

a peripheral flange formed on an outer periphery of the door substrate body;

a hinging wall protruding from the back of the outer periphery of the door substrate body so as to correspond to one side of the air bag case; and a hinging side sandwiching piece extended outwardly and formed on the back of the peripheral flange on the side of the hinge piece or the side wall of the hinge piece, the hinging side sandwiching piece constituting a hinging side sandwiching portion between the hinging side sandwiching piece and the back of the peripheral flange, wherein the peripheral flange is placed on the surface of the peripheral edge of the air bag door opening, the peripheral edge of the air bag door opening sandwiched by the hinging side sandwiching portion, wherein the hinging wall is secured to the air bag case.

3. A method of manufacturing an air bag door portion integrally to an instrument panel substrate, the air bag door portion being pushed when an air bag accommodated in an air bag case on the back of the instrument panel substrate expands so that it is opened, the method comprising the steps of:

preparing a door substrate including a door substrate body formed such as a plate, a peripheral flange formed on an outer periphery of the door substrate body, a hinging wall protruding from the back of the outer periphery of the door substrate body so as to correspond to one side of the air bag case, an attaching wall protruding from the back of the outer periphery of the door substrate body so as to correspond to at least one of the remaining sides of the air bag case, a hinging side sandwiching piece extended outwardly and formed on the back of the peripheral flange on the side of the hinge wall or the side wall of the hinge piece and constituting a hinging side sandwiching portion between the hinging side sandwiching piece and the back of the peripheral flange, a fragile portion for breakage at the stem of the attaching wall, and an attaching side sandwiching piece formed on the side wall of the attaching piece and constituting an attaching portion between the attaching side sandwiching piece and the back of the peripheral flange, the hinging wall having an air bag case securing portion;

arranging an air bag door opening of an instrument panel substrate so that a periphery of the air bag door opening is sandwiched by the hinging side sandwiching portion and the attaching side sandwiching portion;

setting the instrument panel substrate, door substrate and surface member in a foam-molding die; and injecting a foaming material between the instrument panel substrate and door substrate and the surface member; and molding a foam member.

4. A method of manufacturing an air bag door opening according to claim 3, the method further comprising the step of:

breaking the fragile portion for breakage at the stem of the attaching wall so that the attaching wall is separated, after molding the foam member.

5. A structure of an air bag door portion being pushed when an air bag accommodated in an air bag case on the back of an air bag door opening expands so that it is opened at a hinge of one side of a door substrate, the air bag door portion comprising:

a door substrate disposed in an air bag door opening formed in an instrument panel substrate;

a surface member; and a foam member molded between the door substrate and instrument panel substrate and the surface member, wherein the door substrate includes:

a square door substrate body formed such as a plate, one side of which constitutes a hinging side;

an air bag attaching wall protruding from the vicinity of the peripheral edge of the back of at least one of the remaining three walls except the hinging side of the door substrate body, the air bag case attaching wall having a fragile portion for breakage at the stem of the air bag case attaching wall;

an attaching side sandwiching piece formed on the side wall thereof, the attaching side sandwiching piece constituting an attaching portion between the attaching side sandwiching piece and the back of the outer periphery of the substrate body, wherein a side of the door substrate body on its hinging side is secured to the peripheral edge of the air bag door opening and air bag case, the peripheral edge of the air bag door opening is sandwiched by the sandwiching wall, and the air bag attaching wall is secured to the air bag case.

* * * * *